US008300716B1

(12) United States Patent
Lee et al.

(10) Patent No.: US 8,300,716 B1
(45) Date of Patent: Oct. 30, 2012

(54) LINK ADAPTATION FOR OFDM SYSTEMS

(75) Inventors: Jungwon Lee, Cupertino, CA (US);
Jihwan P. Choi, San Jose, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 722 days.

(21) Appl. No.: 12/328,443

(22) Filed: Dec. 4, 2008

Related U.S. Application Data

(60) Provisional application No. 61/016,705, filed on Dec. 26, 2007.

(51) Int. Cl.
H04L 27/28 (2006.01)
(52) U.S. Cl. ........ 375/260; 375/295; 375/259; 375/285; 375/221; 375/219; 370/241; 370/249
(58) Field of Classification Search ............ 375/260, 375/295, 259, 285, 221, 219; 370/241, 249
See application file for complete search history.

(56) References Cited

U.S. PATENT DOCUMENTS

| | | | | |
|---|---|---|---|---|
| 7,072,693 | B2 * | 7/2006 | Farlow et al. | 455/562.1 |
| 7,809,336 | B2 * | 10/2010 | Naguib et al. | 455/69 |
| 2002/0105929 | A1 * | 8/2002 | Chen et al. | 370/335 |
| 2005/0130663 | A1 * | 6/2005 | Hong et al. | 455/445 |
| 2006/0008020 | A1 * | 1/2006 | Blankenship et al. | 375/261 |
| 2006/0057965 | A1 * | 3/2006 | Braun et al. | 455/67.11 |
| 2007/0104149 | A1 * | 5/2007 | Khan et al. | 370/334 |
| 2007/0110002 | A1 * | 5/2007 | Yang et al. | 370/335 |
| 2007/0275666 | A1 | 11/2007 | Lee et al. | |
| 2008/0086662 | A1 * | 4/2008 | Li et al. | 714/704 |
| 2008/0233992 | A1 * | 9/2008 | Oteri et al. | 455/522 |
| 2008/0240216 | A1 * | 10/2008 | Kolding et al. | 375/227 |
| 2010/0220663 | A1 * | 9/2010 | Sawahashi et al. | 370/329 |

OTHER PUBLICATIONS

Cover page of PCT/JP2006/311332 indicating publication date of Dec. 14, 2006.*

International Standard. ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

(Continued)

*Primary Examiner* — Siu Lee

(57) ABSTRACT

A method of adaptively selecting a modulation and coding scheme (MCS) of a communication link includes obtaining a first parameter corresponding to a Quality of Service (QoS) requirement of the communication link, obtaining a second parameter indicative of a physical condition of the communication link, selecting an MCS based on at least the first parameter and the second parameter.

48 Claims, 8 Drawing Sheets

OTHER PUBLICATIONS

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," *The Institute of Electrical and Electronics Engineers, Inc.*, 1999.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

S. A. Mujtaba, "IEEE P802.11—Wireless LANS, TGn Sync Proposal Technical Specification," doc.: IEEE 802.11—04/0889r6, May 2005.

IEEE Std 802.16a-2003 (Amendment to IEEE Std 802.16-2001) "IEEE Standard for Local and metropolitan area networks: Part 16: Air Interface for Fixed Broadband Wireless Access Systems— Amendment 2: Medium Access Control Modifications and Additional Physical Layer Specifications for 2-11 GHZ," *The Institute of Electrical and Electronics Engineers, Inc.*, Apr. 1, 2003.

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

\* cited by examiner

LINK ADAPTATION FOR OFDM SYSTEMS

CROSS REFERENCE TO RELATED APPLICATION

This application claims the benefit of U.S. Provisional Patent App. No. 61/016,705 entitled "Link Adaptation for OFDM Systems," filed Dec. 26, 2007, the disclosure of which is hereby expressly incorporated herein by reference.

FIELD OF TECHNOLOGY

The present disclosure relates generally to communication systems and, more particularly, to dynamically adapting a communication link in an Orthogonal Frequency Division Modulation (OFDM) scheme.

BACKGROUND

An ever-increasing number of relatively inexpensive, low power wireless data communication services, networks and devices have been made available over the past number of years, promising near wire speed transmission and reliability. Various wireless technology is described in detail in the 802.11 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve high data transmission rates using Orthogonal Frequency Division Modulation (OFDM) encoded symbols mapped up to a 64 quadrature amplitude modulation (QAM) multi-carrier constellation. OFDM is a digital multi-carrier modulation scheme that employs a large number of relatively closely spaced orthogonal sub-carriers. Each sub-carrier is itself modulated with a modulation scheme such as quadrature amplitude modulation, phase shift keying, etc., at a relatively low symbol rate. Even though data on a particular sub-carrier is modulated at a low symbol rate, the large number of sub-carriers provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

Generally, transmitters used in the wireless communication systems that are compliant with the aforementioned 802.11a/802.11g/802.11n standards as well as other standards such as the 802.16e IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers.

To better adjust to possible changes in environmental conditions and to varying channel quality requirements, a transmitter may adaptively change a modulation and coding scheme (MCS). To this end, the transmitter typically maintains a packet error count (PER) and selects an appropriate MCS based on the current PER value. More specifically, the transmitter may select an MCS corresponding to a higher data rate if the PER is relatively low or, conversely, selecting an MCS corresponding to a lower data rate if the PER is excessively high. However, MCS selection based on PER only yields a relatively low level of accuracy.

SUMMARY

In one embodiment, a method of adaptively selecting a modulation and coding scheme (MCS) of a communication link includes obtaining a first parameter corresponding to a Quality of Service (QoS) requirement of the communication link, obtaining a second parameter indicative of a physical condition of the communication link, and selecting an MCS based on at least the first parameter and the second parameter.

In another embodiment, a device includes a first module to obtain a first measurement indicative of a physical condition of a communication link and a second module communicatively coupled to the first module to select a modulation and coding scheme (MCS) based on at least the first measurement and a parameter corresponding to a QoS requirement of the communication link.

In another embodiment, a method of estimating an instantaneous value of a parameter indicative of a quality of an OFDM communication link includes obtaining a plurality of measurements indicative of the quality of the OFDM link, each of the plurality of measurements associated with the communication link, calculating a mean based on the plurality of measurements, calculating a standard deviation of the plurality of measurements, and calculating the estimated instantaneous value of the parameter using the mean and the standard deviation.

In another embodiment, an apparatus for estimating an instantaneous value of a parameter indicative of a quality of an OFDM communication link includes a first module to calculate a mean of a plurality of measurements indicative of the quality of the OFDM link, a second module to calculate a mean of the plurality of measurements, and a third module communicatively coupled to the first module and the second module to calculate the estimated instantaneous value of the parameter using the mean and the standard deviation.

In another embodiment, a device includes a memory to store a plurality of MCS values corresponding to different tuples, each tuple associated with a first parameter indicative of a physical condition of the communication link and with a second parameter corresponding to a Quality of Service (QoS) requirement of the communication link, and a link adaptation module coupled to the memory to select an MCS value from the plurality of MCS values based on the first parameter and the second parameter.

DETAILED DESCRIPTION

Figure 1:
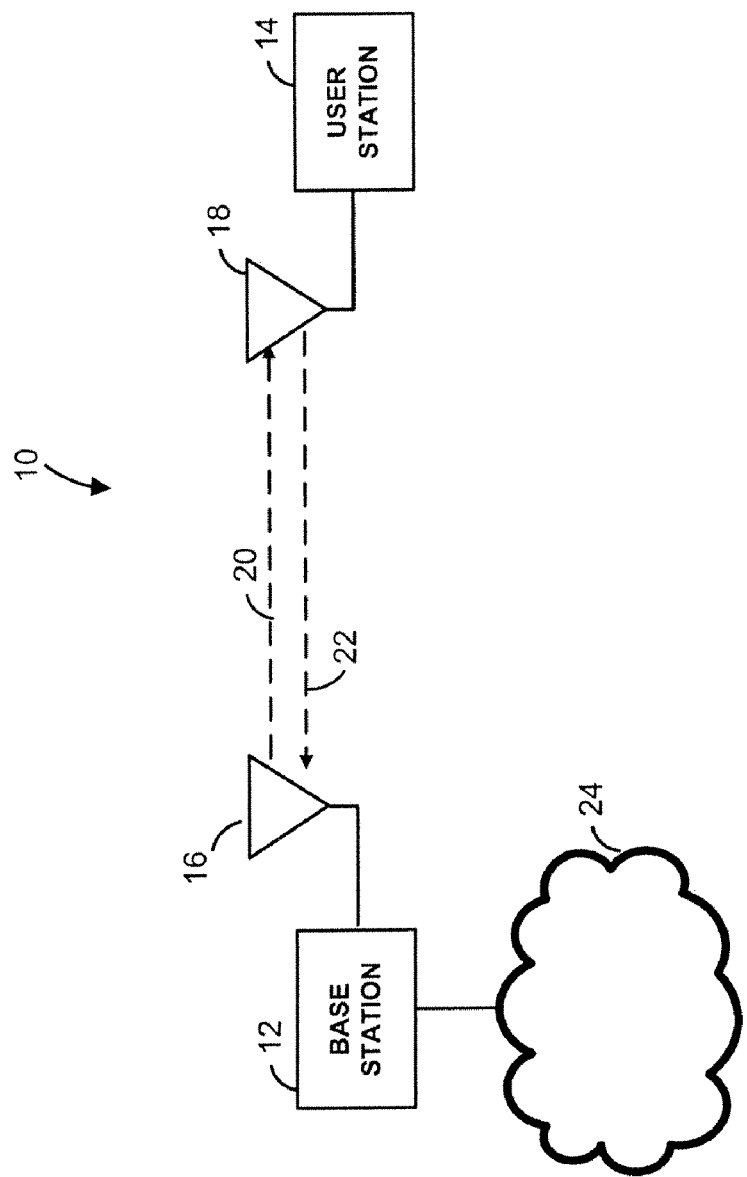
FIG. 1 is a block diagram of a communication system which may utilize a method and apparatus for dynamic link adaptation such as described herein.

FIG. 1 is a block diagram of an example wireless communication system 10 in which a base station 12 wirelessly communicates with a user station 14. Each of the base station 12 and the user station 14 may be equipped with one or several antennas 16 and 18, each of which may transmit and/or receive data to define a downstream communication link 20 and an upstream communication link 22. One or both of the links 20 and 22 may span multiple carrier frequencies, or channels, and/or multiple timeslots. In an embodiment, the base station 12 and the user station 14 communicate according to an OFDM scheme discussed above. As illustrated in FIG. 1, the base station 12 is also communicatively connected to a network 24 which may be, for example, a wired telecommunications infrastructure or a wireless network.

In operation, the base station 12 may obtain information indicative of the quality or performance of the communication links 20 and/or 22 and may utilize this information to adaptively select a suitable MCS. The base station 12 may also adaptively select the MCS further in view of the length of one or several packets to be transmitted via the downstream communication link 20 to the user station 14. Further, the base station 12 may adaptively select the MCS further based on a transmission error metric such as PER, for example. Additionally or alternatively, the mobile station 12 may perform similar link adaptation. It will be noted that the techniques discussed herein generally apply to downlink adaptation, uplink adaptation, or both, and that the discussion below focuses on the base station 12 and downlink adaptation merely for the purposes of conciseness and ease of illustration.

Figure 2:
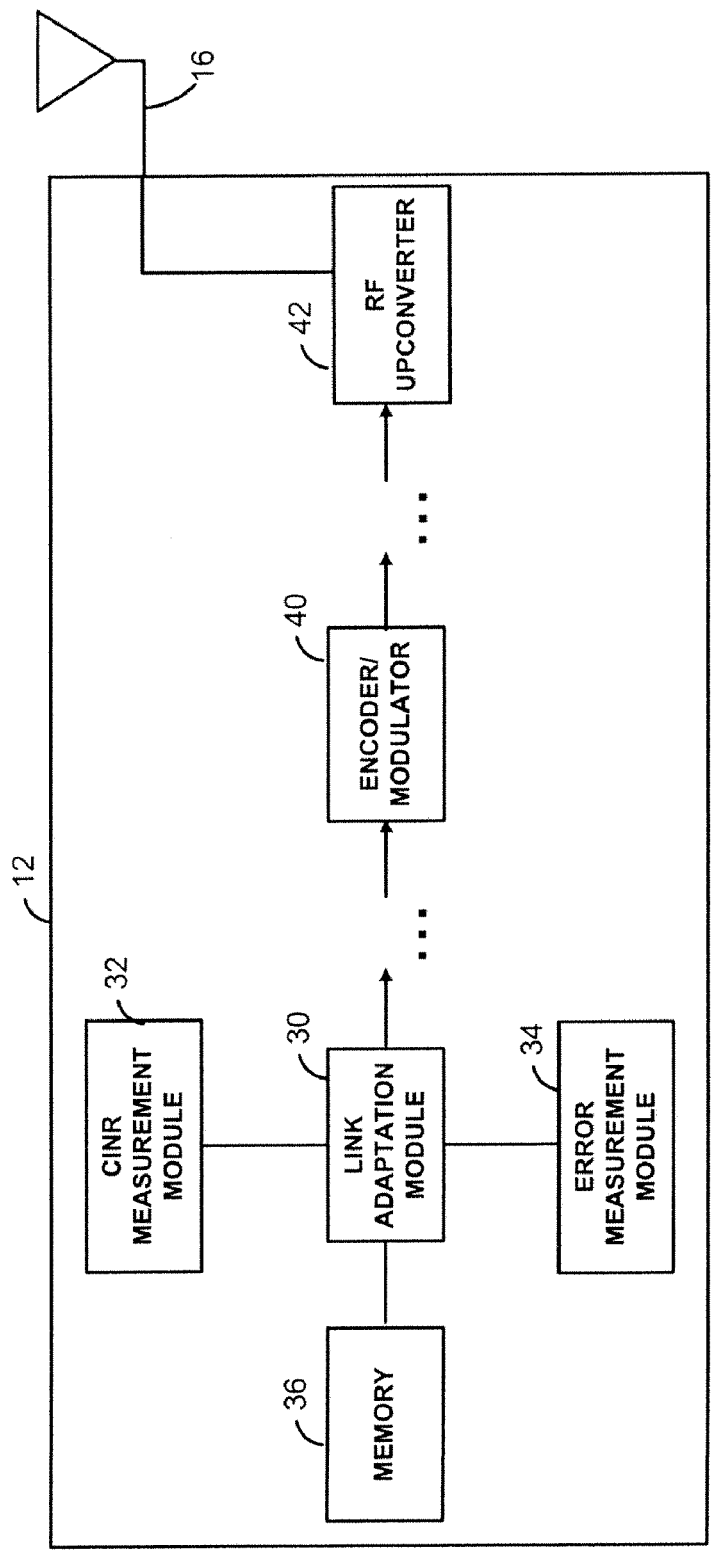
FIG. 2 is a block diagram of a transmitter which may operate in the system illustrated in FIG. 1.

Prior to discussing the components illustrated in FIGS. 1 and 2 in more detail, it will be noted that the PER of a communication link can be considered to be a function of at least one or more of the MCS used to encode the data, the packet length, the physical condition of the one or several channels belonging to the link (e.g., average Carrier-to-Interference-plus-Noise Ratio (CINR), Signal-to-Noise Ratio (SNR), frequency selectivity, time selectivity, etc.), and receiver performance. Accordingly, a transmitter ideally should select MCS values in view of such factors as the target PER, packet length, physical channel condition, and/or receiver performance. However, only some of this information may be available at the base station 12. It may be difficult, for example, to accurately measure receiver performance, or at least to isolate the receiver performance from other factors which may affect the quality of transmissions. On the other hand, the base station 12 may calculate the error rate of the communication link by counting or otherwise monitoring positive (ACK) or negative (NACK) acknowledgement messages. In other words, while the base station 12 typically cannot obtain all the necessary information to optimally select an MCS, the base station 12 may nevertheless efficiently select the MCS by monitoring certain aspects of link performance.

With continued reference to FIG. 1, the base station 12 may obtain channel quality information through channel reciprocity. As is known, the principle of channel reciprocity allows ascertaining the physical condition of the downstream communication link 20 based on the condition of the upstream communication link 22 when the communication links 20 and 22 operate within the same frequency band. In other words, by performing measurements (e.g., SNR, CINR, etc.) related to the upstream communication link 22, the base station 12 may ascertain, with a high degree of confidence, probable results of similar measurements of the downstream communication link 20 at the user station 14. Alternatively, the base station 12 may utilize feedback from the user station 14 to assess the downlink performance or quality.

Referring to FIG. 2, the base station 12 may include a link adaptation module 30 which dynamically selects MCS values based on the data received from a CINR measurement module 32, an error measurement module 34, and Quality of Service (QoS) data which may be stored in a memory 36. Each of the modules 30-36 may be implemented using hardware, software, firmware, or some combination thereof. In the example embodiment illustrated in FIG. 2, the modules 30-34 include computer-readable instructions on a computer-readable memory (or media), and the base station 12 includes a processor (not shown) coupled to the memory 36 to execute the modules 30-34.

The base station 12 may also include a number of components to perform various stages of signal processing. For example, the base station 12 may include an encoder/modulator 40 and a radio frequency (RF) upconverter 42. The encoder/modulator 40 may be directly or indirectly coupled to the link adaptation module 30. Upon selecting and adjusting the MCS value, the link adaptation module 30 may communicate the relevant coding and modulation information to the encoder/modulator 40 and the upconverter 42, respectively, or may control the operation of the encoder/modulator 40 in accordance with the MCS value. To better illustrate the techniques that the base station 12 uses to perform link adaptation, the operation of some of the modules illustrated in FIG. 2 will be discussed in detail.

The CINR measurement module 32 uses channel reciprocity, feedback, or another suitable technique to calculate Carrier-to-Interference-plus-Noise Ratio (CINR) of the downstream communication link 20. For convenience, the CINR measurement module 32 may convert CINR measurements to decibels. In other embodiments, the user station 14 may measure the CINR of the downstream communication link 20 and feed back the measured CINR to the base station 12. In these embodiments, the module 32 may be omitted from the base station 12. In this and similar cases where the receiver rather than the transmitter measures CINR, CINR measurements additionally reflect receiver performance. In yet other embodiments of the base station 12, a component similar to the CINR measurement module 32 may measure another metric indicative of the physical condition of the communication link 20 or 22 as an alternative or in addition to the CINR measurement module 32. For example, the base station 12 may rely on SNR measurements rather than on CINR measurements. Similarly, other such measurements may be made by the user station 14 and fed back to the base station 12.

In the embodiment illustrated in FIG. 2, the CINR measurement module 32 may calculate average CINR values at time intervals 1, 2, k. According to notation used below, $\mu_{CINR\_dB}[k]$ is the mean of CINR measurements in the time interval k, represented in decibels; $\sigma_{CINR\_dB}[k]$ is the standard deviation of the CINR measurements in the time interval k, also in decibels, and $\eta_{CINR\_dB}[k]$ is an estimate of instantaneous CINR within the time interval k. The CINR measurement module 32 may obtain several CINR measurements from the uplink burst payloads and/or preambles or receive measurements of the downlink burst payloads and/or preambles from the user station 14, for example, and derive the statistical mean and the standard deviation from these measurements. Further, because the communication links 20 and 22 typically include multiple sub-carriers, the CINR measurement module 32 may obtain a measurement for each sub-carrier and calculate an average of these measurements. As a simpler alternative, the CINR measurement module 32 may perform a measurement for a single sub-carrier and assume the CINR measurement reflects the condition of all sub-carriers. At each interval k, the CINR measurement module 32 may report the calculated values of $\mu_{CINR\_dB}[k]$ and $\sigma_{CINR\_dB}[k]$ to the link adaptation module 30.

In addition to the CINR measurement module 32, the link adaptation module 30 may utilize error measurements from the error measurement module 34. More specifically, the error measurement module 34 may measure the rate of positive and/or negative acknowledgements received from the upstream communication link 22. In the embodiments of the system 10 where the base station 12 and the user station 14 confirm each individual packet, send a negative acknowledgement for every erroneous packet, or otherwise associate acknowledgment message with individual packets, the error measurement module 34 may calculate the PER using the collected acknowledgement statistics. In other embodiments, the error measurement module 34 may calculate the precise or an approximate PER value using other available information such as bit errors, for example. Conversely, the error measurement module 34 may use packet-level positive or negative acknowledgements to estimate another metric such as the bit error rate, for example.

With continued reference to FIG. 2, the link adaptation module 30 may also obtain parameters associated with a QoS requirement (which may include target PER, for example) prior to selecting the MCS. Specifically, the memory module 36 may store a target PER value which another component (e.g., a software module servicing a higher protocol layer, a user interface, etc.) may update periodically or sporadically in response to a change in performance requirement, for example. Even more specifically, the base station 12 may update the target PER requirement if the data to be transmitted requires a higher degree of accuracy or, conversely, corresponds to a less stringent requirement.

Additionally, the memory module 36 may store an indication of the packet length which the link adaptation module 30 may take into account when selecting the MCS. The packet length indication may refer to the length of the packet in the outbound message queue scheduled for the next transmission or, alternatively, may refer to an average length of a number of packets. Other uses of the packet length indication are also possible.

Figure 3:
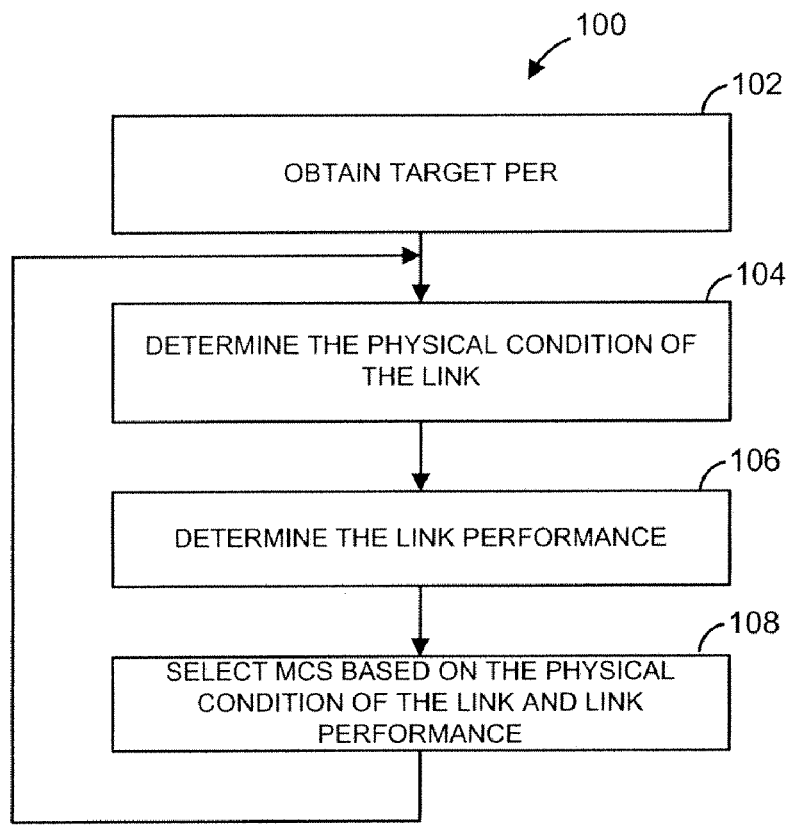
FIG. 3 is an exemplary flowchart of a method implemented by one or several components of a transmitter consistent with the embodiment illustrated in FIG. 2.
Figure 4:
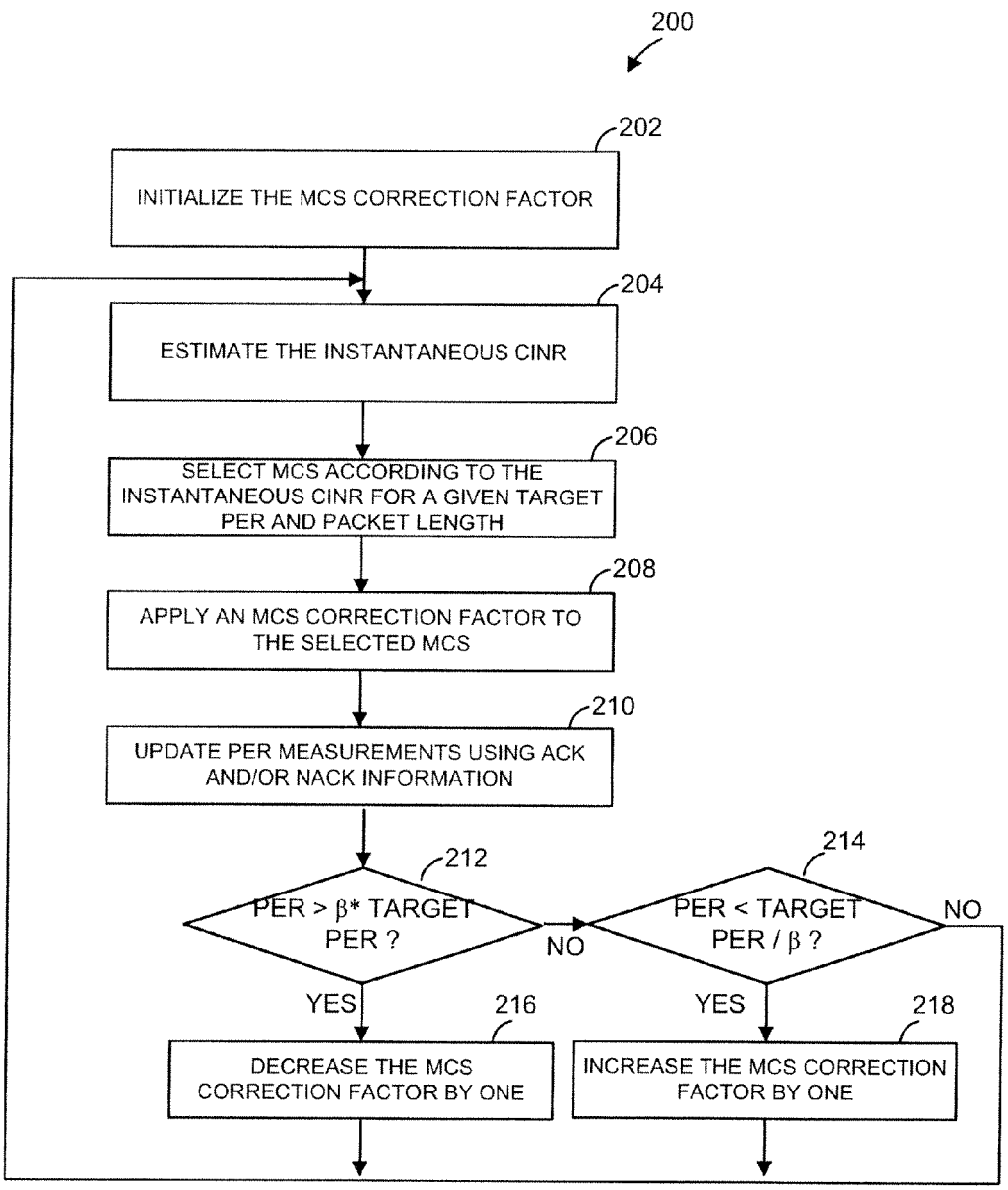
FIG. 4 is another example of a flowchart of a method implemented by one or several components of a transmitter consistent with the embodiment illustrated in FIG. 2.

Upon obtaining CINR data from the CINR measurement module 32, error rate indication from the error measurement module 34, and QoS data and packet length indication from the memory 36, the link adaptation module 30 may select an initial MCS value and then adjust the initial MCS value in order to approach the target PER more closely and efficiently. Selecting and adjusting the MCS value is discussed next in reference to FIG. 3, which is a flow diagram of an example method 100 for adapting a link based on a physical condition of the link and an indication of link performance such as the error rate, for example. FIG. 4 is a flow diagram of another implementation of a link. FIGS. 3 and 4 will be described with reference to FIG. 2 for ease of explanation. It is understood, however, that the methods of FIGS. 3 and 4 need not be implemented by the apparatus of FIG. 2. Also, the apparatus of FIG. 2 can implement methods different than those of FIGS. 3 and 4.

Referring now to FIG. 3, the link adaptation module 30 may obtain one or several QoS parameters, such as the target PER value, for example, in a block 102. As indicated above, the link adaptation module 30 may receive the target PER from the memory 36. However, it is also possible for the link adaptation module 30 to receive the PER from another component or calculate the target PER according to a predefined algorithm or formula, for example. Next, in a block 104, the link adaptation module 30 may determine the physical condition of the downstream communication link 20 using SNR, CINR, or other metrics. The link adaptation module 30 may also obtain an error rate or another indication of the performance of the downstream communication link 20 in a block 106.

Finally, in a block 108, the link adaptation module 30 may select the MCS according to the determined physical condition and the performance indication of the link. As illustrated in FIG. 3, the link adaptation module 30 may iteratively perform the actions corresponding to the blocks 104-108 in an attempt to approach the target PER specified in the block 102. Thus, instead of increasing or decreasing the MCS value merely in response to a decrease or an increase of the PER rate, respectively, the method illustrated in FIG. 3 allows a more accurate selection of MCS based on both the physical condition and a higher PER, for example.

In reference to FIG. 4, the link adaptation module 30 may implement the example method 200 to iteratively select an effective MCS value using a mean and a standard deviation of multiple CINR measurements, update an MCS correction factor using PER data, and to adjust the MCS value using a correction factor. In particular, the link adaptation 30 may initialize the MCS correction factor by setting its value to zero (block 202). Because the link adaptation module 30 may retain the previous value of the MCS correction factor in the memory 36, for example, the MCS correction factor effectively serves as an accumulator of previous adjustment decisions so that each iteration of the method 200 may bring the performance of the base station 12 closer to the target PER requirement.

Next, the link adaptation module 30 may obtain the mean of CINR measurements, $\mu_{CINR\_dB}[k]$, and the standard deviation of CINR measurements, $\sigma_{CINR\_dB}[k]$, from the CINR measurement module 32 (see FIG. 2). Of course, the link adaptation module 30 could also obtain raw CINR measurements and analyze these measurements to determine the mean and the standard deviation. In general, it will be noted that the functionality associated with the method 200 may be distributed among the modules 30-34 in any desired manner and that the particular implementation discussed herein is merely one example implementation.

To estimate an instantaneous value of the CINR in a block 204, the CINR measurement module 32 may apply the following formula:

$$\eta_{CINR\_dB}[k] = 10\log_{10}\left(10^{\mu_{CINR\_dB}[k]/10} - \alpha \cdot 10^{\sigma_{CINR\_dB}[k]/10}\right), \quad (1)$$

where $\eta_{CINR\_dB}[k]$ is a prediction of instantaneous CINR at time k, $\mu_{CINR\_dB}[k]$ is the statistical mean, expressed in decibels, of multiple CINR measurements corresponding to the metric for average CINR, $\sigma_{CINR\_dB}[k]$ is the standard deviation of the multiple CINR measurements at the time k, and α is a coefficient for selecting the degree of confidence. The formula (1) predicts the instantaneous CINR with a quantifiable degree of confidence because the distribution of instantaneous CINR values can be approximated as a Gaussian distribution if there are multiple resolvable paths of the corresponding signal. In particular, the confidence of the prediction of the actual instantaneous CINR value CINR_dB for several values of a is given by:

$$P(CINR\_dB < \eta_{CINR\_dB}[k]) = \begin{cases} 0.16, & \text{for } \alpha = 1 \\ 0.02, & \text{for } \alpha = 2 \end{cases} \quad (2)$$

Thus, the coefficient a helps control the confidence of the prediction. The link adaptation module 30 may receive the coefficient a from the memory 36 or, as one alternative, the value of the coefficient a may be hardwired into the link adaptation module 40 or the link adaptation module 40 may otherwise be pre-configured with a particular value of a. As yet other alternatives, the link adaptation module 40 may obtain the value of a based on an offline numerical evaluation, a simulation, a calculation based on a non-Gaussian distribution, etc.

Next, in a block 206, the link adaptation module 30 may select the MCS value using the instantaneous CINR value calculated in the block 202, $\eta_{CINR\_dB}[k]$, for a given target PER and packet length. In some embodiments, for example, the memory 36 may store a table for each {target PER, packet length} tuple, with an individual entry of each table storing MCS numbers corresponding to different instantaneous CINR values. Thus, a table for a target PER of 1% and a packet length of 1 kilobyte (KB) may store ten entries corresponding to ten different values (or ranges) of CINR, each entry specifying a suitable MCS. In this sense, the collection of MCS values may be viewed as a three-dimensional look-up table indexed by target PER, packet length, and instantaneous CINR values.

In a block 208, the link adaptation module 30 may apply the MCS correction factor to the selected MCS. Because the initial value of the MCS correction factor is 0, the link adaptation module 30 effectively leaves the selected MCS value intact when executing the first iteration of the method 200. However, after the MCS correction acquires a non-zero value at a later stage of executing the method 200 (see below), the link adaptation module 30 updates the MCS during a second iteration based on the MCS correction factor selected in the first iteration. Similarly, during a third iteration, the MCS correction factor reflects the decisions of the method 200 in the second and first iterations, etc.

From the foregoing, and particularly from the discussion of blocks 206 and 208, it will be appreciated that the method 200 varies the MCS value in a gradual manner and generally precludes sudden changes in modulation and coding. Because the ACK/NACK count is typically a slow-varying quantity, the method 200 accordingly adjusts the MCS at a relatively slow rate, at least with respect to similar {target PER, packet length} tuples.

With continued reference to FIG. 4, the link adaptation module 30 updates the MCS correction factor in blocks 210, 212, 214, 216, and 218. Specifically, in the block 210, the link adaptation module 30 updates the PER measurement or another error metric using positive and/or negative acknowledgements. Next, in the blocks 212 and 214, the link adaptation module 30 compares the updated PER value to the target PER to assess the proximity to the target PER. In the example method 200, the target PER is adjusted by a tolerance factor β. In particular, the link adaptation module 30 may multiply the target PER by β (which may selected to be 1.1, for example, or any other suitable value) when checking whether the updated PER is greater than the target PER and divide the target PER by β when checking whether the updated PER is smaller than the target PER. In other embodiments, the link adaptation module 30 may similarly add and subtract a certain tolerance factor β in the respective blocks 212 and 214. In yet another embodiment, the method 200 may not use a tolerance factor at all.

In the blocks 216 and 218, the link adaptation module 30 increases or decreases the MCS correction factor by a predefined unit. In the example illustrated in FIG. 4, the link adaptation module 30 adjusts the MCS correction factor by one. Of course, other suitable adjustment intervals may also be utilized. Upon adjusting the MCS correction factor, the method 200 returns to the block 204 for the next iteration. It is noted that the link adaptation module 30 may control the frequency of iterations in any desired manner. For example, the link adaptation module 30 may estimate the instantaneous CINR for every outgoing packet, for every one hundred packets, once per minute, etc.

It will be further noted that the methods 100 or 200 do not utilize a frequency selectivity metric, or the rate of switching between sub-carriers, when selecting corresponding MCS values. Because most OFDM systems perform coding across multiple sub-carriers, frequency selectivity does not have a significant impact on MCS selection. However, in some contemplated embodiments, the methods 100 and 200 may be further refined to use frequency selectivity information when such information is available at the link adaptation module 30. For example, a method may use a metric of frequency selectivity as another dimension of the MCS look-up table, or may generate sub-carrier-specific MCS values and/or correction factors.

In some embodiments, the amount of memory required to store each MCS entry may be reduced by adjusting the method 100 or 200 to consider ranges of packet lengths rather than actual packet length values. For example, packets with lengths of 1 to x coding blocks may be associated with a first range for the purposes of looking up the MCS value, packets with lengths of x+1 to y coding blocks may be associated with a second range, etc. Similarly, measured or target PER values may be considered in ranges (e.g., 1% to 10%, 11% to 20%, etc.) to further simplify the look-up process and reduce the memory requirement.

In these or other embodiments, the instantaneous CINR may be adjusted according to the formula:

$$\zeta_{CINR\_dB}[k] = \eta_{CINR\_dB}[k] - c(PER_{TARGET}), \quad (3)$$

where c is a function that returns an adjustment value according to the value of target PER. In this manner, a subsequent selection of MCS may be based on the adjusted instantaneous CINR value $\zeta_{CINR\_dB}[k]$ and, if desired, on the packet length. In this regard, it is noted that the SNR difference corresponding to different MCS values remains the same over a practical range of target PER values. As another alternative, the adjusted instantaneous CINR value $\zeta_{CINR\_dB}[k]$ may be calculated using the value c dependent on both the target PER and the packet length:

$$\zeta_{CINR\_dB}[k] = \eta_{CINR\_dB}[k] - c(PER_{TARGET}, \text{Packet Length}). \quad (4)$$

Finally, another simplified scheme may utilize a single table indexed by PER and instantaneous SNR measurements. In this scheme, SNR correction factors may be stored for different target PER values and packet lengths.

Figure 5:
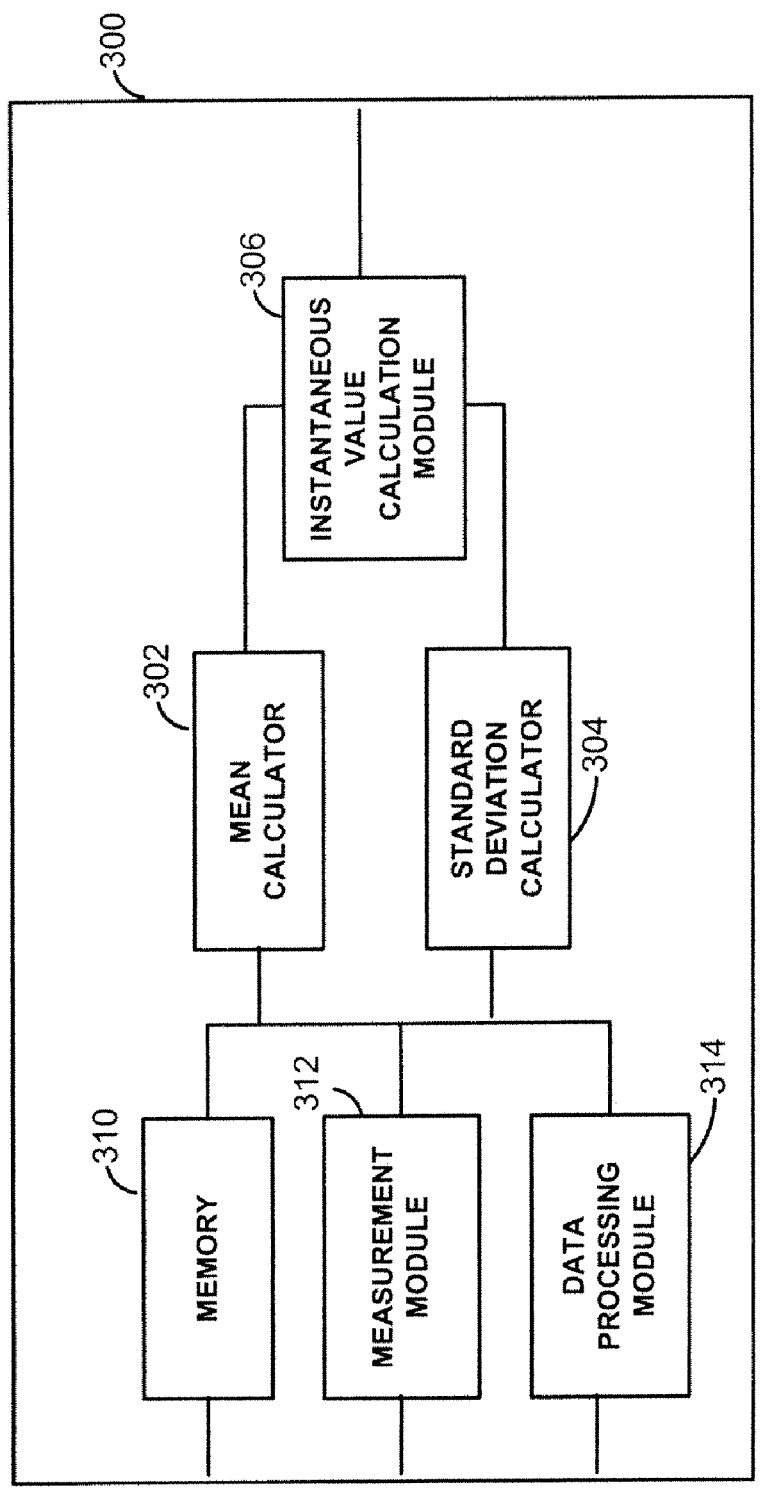
FIG. 5 is block diagram of an apparatus which may be used in the system illustrated in FIG. 1 to estimate an instantaneous value of a parameter indicative of a physical quality of a link.

Referring now to FIG. 5, an apparatus 300 may implement a method discussed above to estimate an instantaneous value of a parameter indicative of the physical condition of a link such as the downstream communication link 20 or the upstream communication link 22. The apparatus 300 may be implemented using hardware, software, firmware, or some combination thereof. One or both of the base station 12 or the user station 14 may include, implement, or interface with the apparatus 300 to support the link adaptation techniques discussed above. For the purposes of clarity, the apparatus 300 will be discussed below with reference to CINR calculation. However, it will be understood that the apparatus 300 may be utilized to similarly estimate another one or several quantities.

The apparatus 300 may include a mean calculator 302 and a standard deviation calculator 304, both of which may be coupled to an instantaneous value calculation module 306. Each of the mean calculator 302 and the standard deviation calculator 304 may receive CINR measurements from a memory 310, a measurement module 312, and/or a data processing module 314. In particular, the measurement module 312 may measure CINR using any suitable techniques, including those known in the art. To this end, the measurement module 312 may be connected to a channel interface (e.g., an antenna) of the base station 12 or the user station 14. As discussed above, the base station 12 or the user station 14 may use feedback or channel reciprocity principles to estimate CINR, SNR, and other physical quantities indicative of the quality of the downstream link 20 or the upstream link 22, respectively.

Alternatively, the data processing module 314 may receive CINR measurements from an external source such as an analyzer or another measurement device. In some embodiments, the base station 12 may receive, via the upstream communication link 22 and the data processing module 314, CINR measurements performed by the user station 14. Each of the data processing module 314 and the measurement module 312 may store CINR measurements in the memory 310. It is also noted that in at least some embodiments, one or two of the modules 310, 312, or 314 may be omitted.

The mean calculator 302 may calculate the statistical mean of the CINR measurements received from one or several modules 310, 312, or 314. Meanwhile, the standard deviation calculator 304 may obtain a metric of time selectivity of the communication link 20 or 22 such as, for example, the standard deviation of the CINR measurements. Finally, the instantaneous value calculation module 306 may estimate an instantaneous CINR using the techniques discussed above. For example, the instantaneous value calculation module may apply the formula $$\eta_{CINR\_dB}[k] = 10\log_{10}\bigl(10^{\mu_{CINR\_dB}[k]/10} - \alpha \cdot 10^{\sigma_{CINR\_dB}[k]/10}\bigr).$$

In this embodiment, the instantaneous value calculation module 306 may retrieve the value of a from the memory 310 or, alternatively, may utilize a hardwired or hard-coded value.

Methods and components for dynamic link adaptation such as those described above may be utilized in various devices operating in OFDM and in similar networks. For example, techniques such as described above may be utilized in base stations, access points, wireless routers, etc. Additionally, FIGS. 6A-6F illustrate various devices in which link adaptation techniques such as described above, may be employed.

Figure 6A:
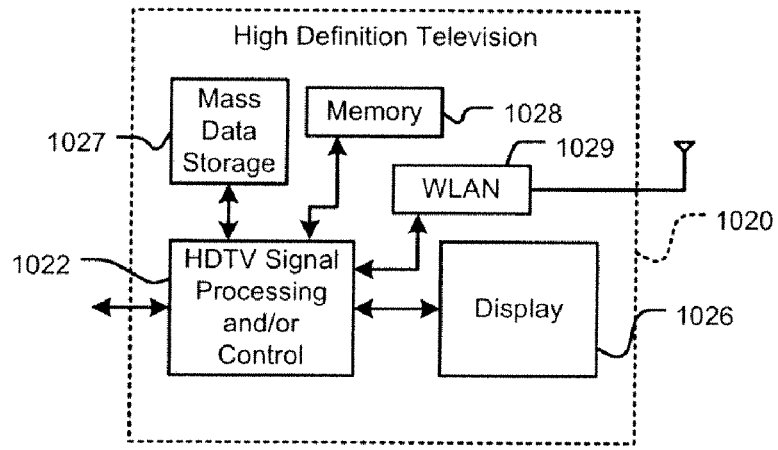
FIG. 6A is a block diagram of a high definition television that may utilize a method and system for dynamic link adaptation such as described herein.

Referring now to FIG. 6A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8" HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement dynamic link adaptation techniques such as described above.

Figure 6B:
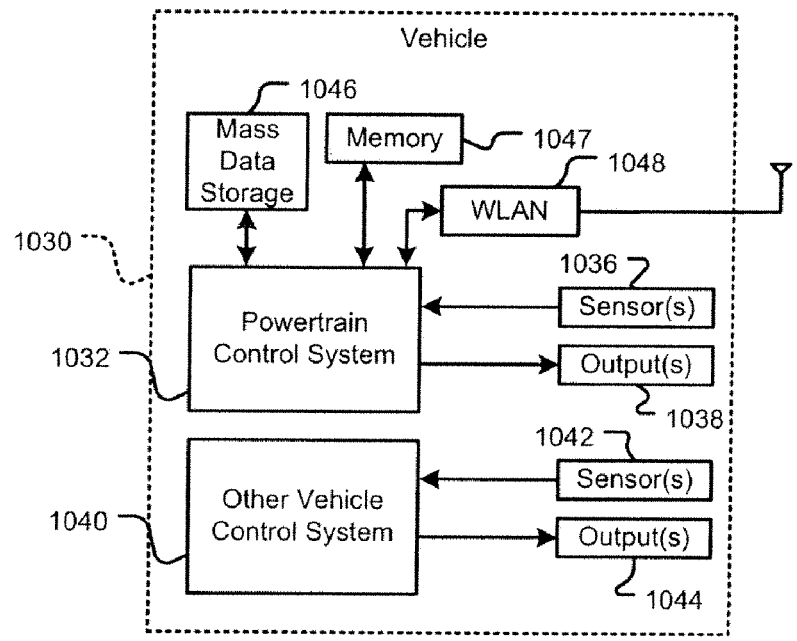
FIG. 6B is a block diagram of a vehicle that may utilize a method and system for dynamic link adaptation such as described herein.

Referring now to FIG. 6B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement dynamic link adaptation techniques such as described above.

Figure 6C:
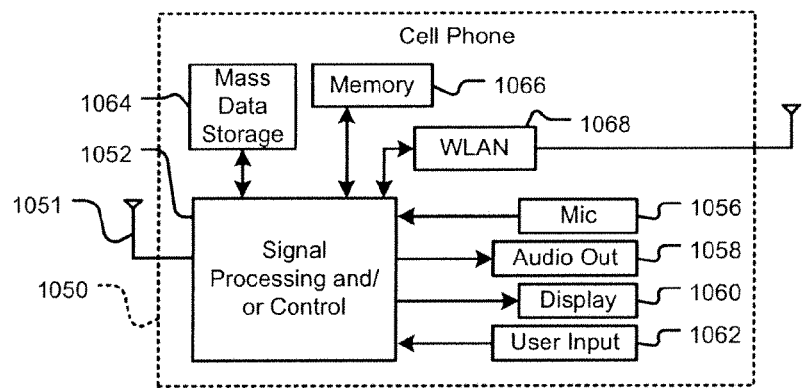
FIG. 6C is a block diagram of a cell phone that may utilize a method and system for dynamic link adaptation such as described herein.

Referring now to FIG. 6C, such techniques may be used in a cellular phone 1050 that may include a cellular antenna 1051. The cellular phone 1050 may include either or both signal processing and/or control circuits, which are generally identified in FIG. 6C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement dynamic link adaptation techniques such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement dynamic link adaptation techniques such as described above.

Figure 6D:
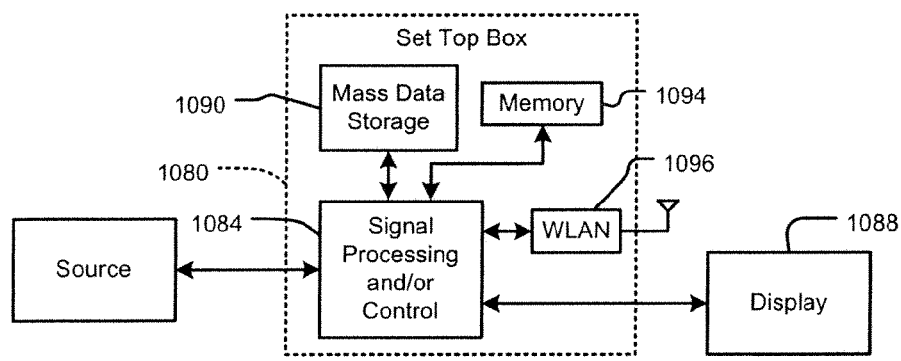
FIG. 6D is a block diagram of a set top box that may utilize a method and system for dynamic link adaptation such as described herein.

Referring now to FIG. 6D, such techniques may be utilized in a set top box 1080. The set top box 1080 may include either or both signal processing and/or control circuits, which are generally identified in FIG. 6D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement dynamic link adaptation techniques such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement dynamic link adaptation techniques such as described above.

Figure 6E:
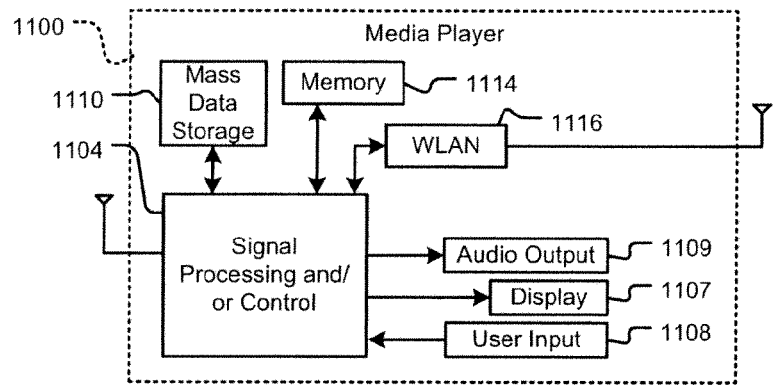
FIG. 6E is a block diagram of a media player that may utilize a method and system for dynamic link adaptation such as described herein.

Referring now to FIG. 6E, such techniques may be used in a media player 1100. The media player 1100 may include either or both signal processing and/or control circuits, which are generally identified in FIG. 6E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function. Signal processing and/or control circuits 1104 may implement link adaptation techniques such as described above.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement dynamic link adaptation techniques such as described above.

Figure 6F:
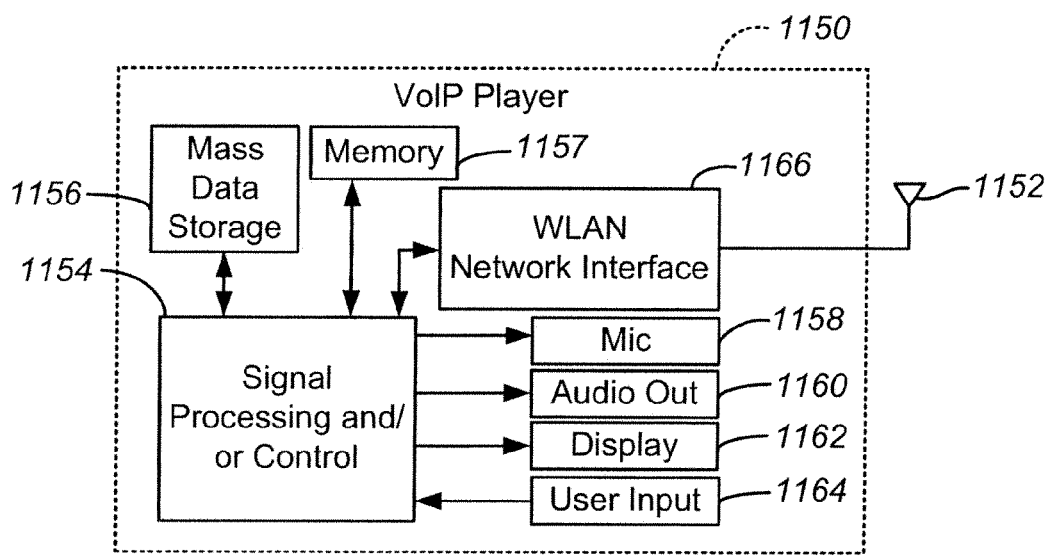
FIG. 6F is a block diagram of a voice-over-IP (VoIP) player that may utilize a method and system for dynamic link adaptation such as described herein.

Referring to FIG. 6F, such techniques may be utilized in a Voice over Internet Protocol (VoIP) phone 1150 that may include an antenna 1152. The VoIP phone 1150 may include either or both signal processing and/or control circuits, which are generally identified in FIG. 6F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a WLAN network interface 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WLAN interface 1166. The WLAN interface 1166 may implement signal decoding techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of adaptively selecting a modulation and coding scheme (MCS) of a communication link, the method comprising:
    obtaining a first parameter corresponding to a Quality of Service (QoS) requirement of the communication link;
    obtaining a second parameter indicative of a physical condition of the communication link, wherein obtaining the second parameter includes estimating an instantaneous value of Carrier-to-Interference-plus-Noise Ratio (CINR) according to a formula:

$$\eta_{CINR\_dB}[k] = 10\log_{10}\left(10^{\mu_{CINR\_dB}[k]/10} - \alpha \cdot 10^{\sigma_{CINR\_dB}[k]/10}\right),$$

wherein
    $\mu_{CINR\_dB}[k]$ is a mean of a plurality of CINR measurements in decibels at a time k,
    $\sigma_{CINR\_dB}[k]$ is a standard deviation of the plurality of CINR measurements at the time k, and
    $\alpha$ is a coefficient to select a degree of confidence of estimating the instantaneous value of CINR; and
selecting an MCS as a function of at least the first parameter, the second parameter, and a given packet length.

2. The method of claim 1, wherein obtaining the second parameter includes obtaining a Carrier-to-Interference-plus-Noise Ratio (CINR) measurement associated with the communication link.

3. The method of claim 1, wherein obtaining the second parameter includes:
    obtaining a plurality of CINR measurements associated with the communication link;
    calculating an average CINR based on the plurality of CINR measurements; and
    obtaining a metric for time selectivity of the communication link.

4. The method of claim 3, wherein obtaining a metric for time selectivity of the communication link includes calculating a standard deviation of the plurality of CINR measurements.

5. The method of claim 3, wherein the communication link utilizes Orthogonal Frequency Division Modulation (OFDM) and wherein the communication link includes a plurality of sub-carriers; and wherein obtaining a plurality of CINR measurements includes obtaining a corresponding CINR measurement at each of the plurality of sub-carriers.

6. The method of claim 1, wherein obtaining the first parameter includes obtaining a target packet error rate of the communication link.

7. The method of claim 1, further comprising:
    determining a packet error rate associated with the communication link; and
    adjusting the selected MCS according to the determined packet error rate.

8. The method of claim 7, wherein determining the packet error rate includes counting acknowledgements received at one of a base station or a user station from the other one of the base station or the user station.

9. The method of claim 7, further comprising:
    initializing an MCS correction factor to an initial value prior to obtaining the second parameter, selecting the MCS, determining the packet error rate, and adjusting the selected MCS; and
    updating the MCS correction factor based on the determined packet error rate; and wherein
    adjusting the selected MCS includes applying the MCS correction factor to the selected MCS prior to updating the MCS correction factor.

10. The method of claim 7, wherein the first parameter corresponding to the QoS requirement is a target packet error rate, the method further comprising:
    comparing the determined packet error rate to the target packet error rate; and
    iteratively repeating the acts of obtaining the second parameter, selecting the MCS, determining the packet error rate, and adjusting the selected MCS while the determined packet error rate differs from the target packet error rate.

11. The method of claim 10, wherein comparing the determined packet error rate to the target packet error rate includes adjusting the target packet error rate by a tolerance factor.

12. The method of claim 1, wherein obtaining the second parameter indicative of the physical condition of the communication link includes obtaining information at one of a base station or a user station through a feedback from the other one of the user station or the base station.

13. The method of claim 1, wherein obtaining the second parameter indicative of the physical condition of the communication link includes obtaining information at one of a base station or a user station through channel reciprocity.

14. The method of claim 1, further comprising:
obtaining frequency selectivity information; and
selecting the MCS as a function of the first parameter, the second parameter, and the given packet length further in view of the frequency selectivity information.

15. The method of claim 1, further comprising:
obtaining a third parameter indicative of a performance of the communication link; and
adjusting the selected MCS value using the third parameter.

16. The method of claim 15, wherein obtaining the first parameter includes obtaining a target packet error rate and wherein obtaining the third parameter includes determining a packet error rate.

17. The method of claim 15, wherein obtaining the second parameter includes estimating an instantaneous CINR value using at least a statistical mean of a plurality of CINR measurements and a standard deviation of the plurality of CINR measurements.

18. The method of claim 15, further comprising adjusting the second parameter based on the given packet length prior to selecting the MCS value.

19. The method of claim 15, further comprising adjusting the second parameter based on the given packet length and a target packet error rate prior to selecting the MCS value.

20. A device comprising:
a first module, implemented in hardware, configured to obtain a CINR measurement indicative of a physical condition of a communication link, wherein the first module utilizes a plurality of Carrier-to-Interference-plus-Noise Ratio (CINR) measurements including the CINR measurement to calculate an instantaneous value of CINR according to a formula:

$$\eta_{CINR\_dB}[k] = 10\log_{10}\bigl(10^{\mu_{CINR\_dB}[k]/10} - \alpha \cdot 10^{\sigma_{CINR\_dB}[k]/10}\bigr),$$

wherein
$\mu_{CINR\_dB}[k]$ is a mean of the plurality of CINR measurements in decibels at a time k,
$\sigma_{CINR\_dB}[k]$ is a standard deviation of the plurality of CINR measurements at the time k, and
$\alpha$ is a coefficient to select a degree of confidence of estimating the instantaneous value of CINR;
a second module, implemented in hardware, configured to select a modulation and coding scheme (MCS) as a function of at least the instantaneous CINR measurement, a parameter corresponding to a Quality of Service (QoS) requirement of the communication link, and a given packet length.

21. The device of claim 20, wherein the communication link utilizes an OFDM scheme.

22. The device of claim 20, further comprising:
a third module, implemented in hardware, configured to obtain a second measurement indicative of a performance of the communication link; and adjust the selected MCS based on the second measurement.

23. The device of claim 22, wherein the second measurement is indicative of an error rate of the communication link.

24. The device of claim 22, further comprising:
a memory to store an MCS correction factor, wherein the second module applies the MCS correction factor to the selected MCS.

25. The device of claim 22, further comprising:
a memory to store a plurality of MCS values corresponding to different instantaneous CINR measurement, second measurement, and packet length tuples, wherein the second module selects the MCS from the plurality of MCS values based on at least the instantaneous CINR measurement, the second measurement, and the given packet length.

26. The device of claim 25, wherein the second module selects the MCS from the plurality of MCS values further based on a target packet error rate value.

27. The device of claim 20, further comprising:
an encoder to encode data according to the selected MCS; and
a modulator to modulate the data according to the selected MCS.

28. The device of claim 20, wherein the first module obtains the CINR measurement at one of a base station or a user station through a feedback from the other one of the user station or the base station.

29. The device of claim 20, wherein the first module obtains the CINR measurement at one of a base station or a user station through channel reciprocity.

30. The device of claim 20, wherein the second module adjusts the instantaneous CINR measurement based on the given packet length prior to selecting the MCS.

31. The device of claim 20, wherein the second module adjusts the instantaneous CINR measurement based on the given packet length and a target packet error rate prior to selecting the MCS.

32. A method of estimating an instantaneous value of a Carrier-to-Interference-plus-Noise Ratio (CINR) indicative of a quality of an OFDM communication link, comprising:
obtaining a plurality of measurements indicative of the quality of the OFDM communication link, each of the plurality of measurements corresponding to a different time within a time interval;
calculating a mean based on the plurality of measurements;
calculating a standard deviation of the plurality of measurements; and
calculating the instantaneous value of the CINR using the mean and the standard deviation.

33. The method of claim 32, further comprising:
determining a selection parameter according to a target confidence level; wherein calculating the estimated instantaneous value of the CINR is further based on the selection parameter.

34. The method of claim 32, wherein calculating the estimated instantaneous value of the CINR includes applying a formula:

$$\eta_{Param\_DB}[k] = 10\log_{10}\bigl(10^{\mu_{Param\_dB}[k]/10} - \alpha \cdot 10^{\sigma_{Param\_dB}[k]/10}\bigr),$$

wherein
$\mu_{Param\_dB}[k]$ is the mean based on the plurality of measurements in decibels at a time k;
$\sigma_{Param\_dB}[k]$ is the standard deviation of the plurality of measurements at the time k; and
$\alpha$ is the selection parameter that controls a degree of confidence of predicting the instantaneous value.

35. An apparatus for estimating an instantaneous value of a Carrier-to-Interference-plus-Noise Ratio (CINR) indicative of a quality of an OFDM communication link, the apparatus comprising:
a first module, implemented in hardware, configured to calculate a mean of a plurality of measurements indicative of the quality of the OFDM communication link, wherein each of the plurality of measurements corresponds to a different time within a time interval;
a second module, implemented in hardware, configured to calculate a standard deviation of the plurality of measurements; and
a third module, implemented in hardware, configured to calculate the instantaneous value of the CINR using the mean and the standard deviation.

36. The apparatus of claim 35, further a fourth module, implemented in hardware, configured to obtain the plurality of measurements.

37. The apparatus of claim 36, wherein the fourth module obtains the plurality of measurements by performing measurements at least one of a base station and a user station.

38. The apparatus of claim 36, wherein the fourth module obtains the plurality of measurements at one of a base station or a user station from the other one of the base station or the user station via the OFDM communication link.

39. The apparatus of claim 35, wherein the third module calculates the estimated instantaneous value by applying a formula:

$$\eta_{Param\_DB}[k] = 10\log_{10}\left(10^{\mu_{Param\_dB}[k]/10} - \alpha \cdot 10^{\sigma_{Param\_dB}[k]/10}\right),$$

wherein
$\mu_{Param\_dB}[k]$ is the mean based on the plurality of measurements in decibels at a time k;
$\sigma_{Param\_dB}[k]$ is the standard deviation of the plurality of measurements at the time k; and
$\alpha$ is a selection parameter that controls a degree of confidence of predicting the instantaneous value.

40. A device comprising:
a memory to store a plurality of modulation and coding scheme (MCS) values corresponding to different tuples, each tuple including a first element associated with a first parameter indicative of a physical condition of a communication link, a second element associated with a second parameter corresponding to a Quality of Service (QoS) requirement of the communication link, and a third element associated with a given packet length;
a CINR measurement module configured to obtain the first parameter by utilizing a plurality of Carrier-to-Interference-plus-Noise Ratio (CINR) measurements to calculate an instantaneous value of CINR according to a formula:

$$\eta_{CINR\_dB}[k] = 10\log_{10}\left(10^{\mu_{CINR\_dB}[k]/10} - \alpha \cdot 10^{\sigma_{CINR\_dB}[k]/10}\right),$$

wherein
$\mu_{CINR\_dB}[k]$ is a mean of the plurality of CINR measurements in decibels at a time k,
$\sigma_{CINR\_dB}[k]$ is a standard deviation of the plurality of CINR measurements at the time k, and
$\alpha$ is a coefficient to select a degree of confidence of estimating the instantaneous value of CINR; and
a link adaptation module to select an MCS value from the plurality of MCS values based on the first parameter, the second parameter, and the given packet length.

41. The device of claim 40, wherein the first parameter is a Carrier-to-Interference-plus-Noise Ratio (CINR) of the communication link.

42. The device of claim 41, wherein the first parameter is an estimate of instantaneous CINR value.

43. The device of claim 40, wherein the second parameter is a target packet error rate of the communication link.

44. The device of claim 40, further comprising a module to obtain a third parameter indicative of a performance of the communication link.

45. The device of claim 44, wherein the third parameter is a packet error rate of the communication link.

46. The device of claim 44, wherein the link adaptation module adjusts the selected MCS value based on the third parameter.

47. The device of claim 44, wherein the memory further stores an MCS correction factor; and wherein the link adaptation module updates the MCS correction factor based on the third parameter; and wherein the link adaptation link adjusts the selected MCS value using the MCS correction factor.

48. The device of claim 44, wherein the communication link utilizes Orthogonal Frequency Division Modulation (OFDM).

* * * * *